Mar. 6, 1923.
E. F. STENMAN
SNAP FASTENER
Filed June 10, 1920
1,447,440
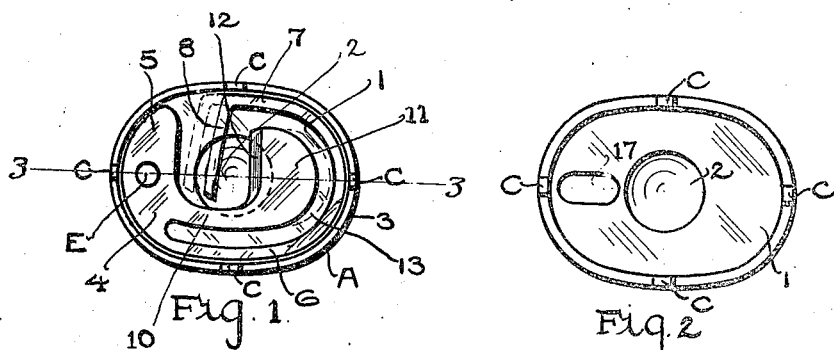
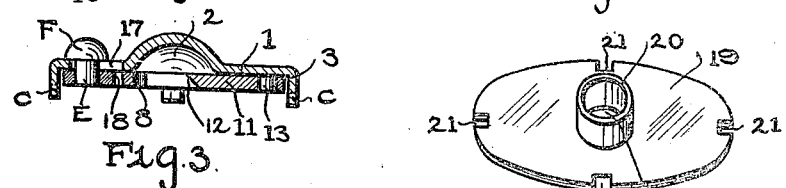
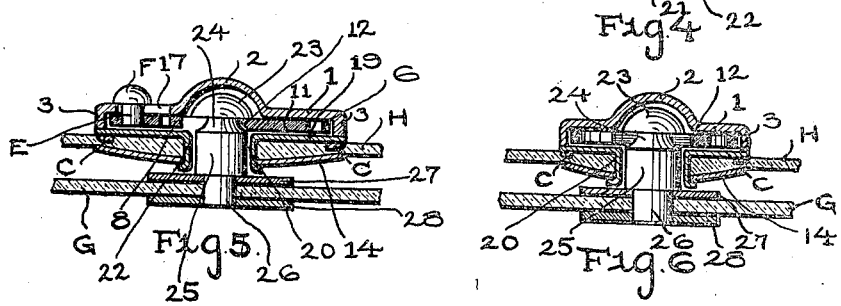
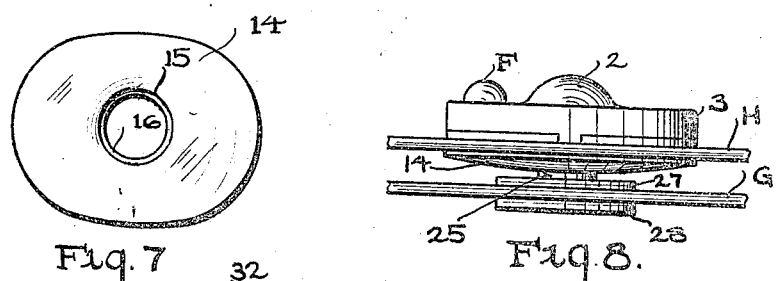
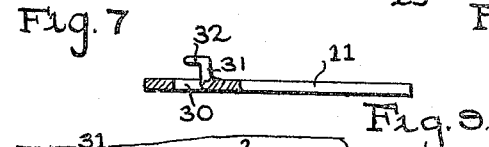
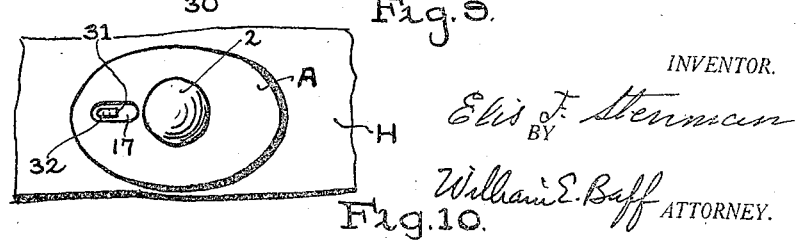
INVENTOR.
Elis F. Stenman
BY
William E. Baff ATTORNEY.

Patented Mar. 6, 1923.

1,447,440

UNITED STATES PATENT OFFICE.

ELIS F. STENMAN, OF LYNN, MASSACHUSETTS.

SNAP FASTENER.

Application filed June 10, 1920. Serial No. 388,063.

*To all whom it may concern:*

Be it known that I, ELIS F. STENMAN, a citizen of the United States, and a resident of the city of Lynn, in the county of Essex and State of Massachusetts, have invented new and useful Improvements in Snap Fasteners, of which the following, together with the accompanying drawings, is a specification.

My invention relates to snap fasteners of the stud and socket type that are particularly adapted for holding together, or otherwise securing parts, such as curtains and the like, which are incidental to automobiles, aeroplanes, boats, and similar devices.

The object of my invention is to provide a fastener of the above described type, the members of which may be cheaply manufactured, easily assembled and readily attached to the parts to be secured together. A further object of my invention is to provide a fastener in which the members may be quickly locked together, and which, when once locked, are proof against accidental disengagement.

In the accompanying drawings,

Fig. 1 is a plan view of the socket member of the fastener, with the housing cover removed.

Fig. 2 is a plan view of the housing for the socket member.

Fig. 3 is a transverse sectional view of the parts shown in Fig. 1.

Fig. 4 is a perspective view of the cover plate for the housing shown in Fig. 2.

Fig. 5 is a transverse sectional view similar to Fig. 3, showing the plug received in the socket member.

Fig. 6 is a sectional view of the parts shown in Fig. 5, the section being taken at right angles to that of Fig. 5.

Fig. 7 is a plan view of the clamping plate for the socket member of the housing.

Fig. 8 is a view in side elevation, showing the members of the fastener secured together.

Fig. 9 is a view, partially in section and partially in side elevation, showing a modified form of locking member.

Fig. 10 is a top plan view of a socket provided with the modified form of locking member shown in Fig. 9.

Like reference characters refer to like parts in the different figures.

Referring to the drawings, the socket member of the fastener is shown inclosed in a housing A, the base 1 of which is provided with a circular depression 2. The depression 2 is centrally located with respect to a rim 3 which forms the outer periphery of the housing A. The rim 3 is provided with a plurality of spaced lugs C, the purpose of which will be hereinafter described.

A locking member 4 is located within the housing A and is provided with an arcuate portion 5, the contour of which substantially conforms to the rim 3 of the housing A. The locking member 4 is provided with a resilient portion 6 which is in the form of a coil spring and extends around the housing A in contact with the rim 3, as shown at 7. The spring portion 6 terminates in a finger 8 which extends transversely across the depression 2 and is substantially at right angles to the rim 3. The locking member 4 is also provided with an arm 10, which extends longitudinally of the housing A and terminates in a jaw 11. The jaw 11 is arcuate in form and is provided with a bevelled edge 12 that is substantially parallel to the finger 8. The spring portion 6 always tends to closely engage the rim 3 and to hold the arcuate portion of the jaw 11 away from the rim, as indicated at 13.

The housing A is closed by a cover plate 19 which, as best shown in Fig. 4, is provided with a flange 20 surrounding a central opening 22. Spaced notches 21 are provided on the outer periphery of the plate for receiving the lugs C on the rim 3 of the housing A, the lugs C being riveted over to secure the plate 19 in position. The flange 20 of the plate 19 extends through an opening provided in the material H to which it is desired to secure the socket member, and a clamping plate 14, located on the opposite side of the material, is provided with an opening 15 for receiving the flange 20. The edge of the opening 15 is countersunk, as shown at 16, for receiving the riveted over end of the flange 20.

The housing A together with the locking member 4 and the plates 14 and 19 constitute a complete unit when assembled on the material H. The locking member 4 is adapted to be operated from the outside of the housing A by means of a knob F, which is provided with a shank E secured to the arcuate portion 5. A slot 17 is provided in the base 1 of the housing A, so that the jaw 11 can be moved against the spring portion 6 by means of the knob F. The finger 8 and the bevelled edge 12 of the jaw 11 are shown extending transversely across the depression 2 in position to receive the stud of the fastener, which will now be described.

Referring to Figs. 5 and 6, a stud 23 having a rounded head is provided with a circumferential groove 24 and a stem 25 adapted to fit loosely within the flange 20. The stem 25 terminates in a reduced portion 26 which extends through the material G to which it is desired to secure the stud 23. The stud 23 is secured to the material G by means of plates 27 and 28.

When it is desired to secure the materials G and H together by means of my fastener, the stud 23 is inserted into the opening 22, the walls of the flange 20 serving to guide the stud 23 into the depression 2 of the housing A. When the round head of the stud 23 encounters the bevelled edge 12, the jaw 11 is forced aside, but as soon as the stud 23 enters the depression 2, the jaw 11 will enter the groove 24 under the pressure of the spring portion 6. The finger 8 will also enter the groove 24 so that the stud is held firmly in the socket member against accidental displacement. As the finger 8 and the jaw 11 are held in the groove 24 by the inherent resiliency of the locking member 4, it is obvious that it is practically impossible to pull the stud from the socket member by the application of force to the materials G and H.

When, however, it is desired to remove the stud from the socket member, it is only necessary to push the knob F in the direction of the stud. This direct application of force to the arcuate member 5 causes the spring portion 6 to move circumferentially around the rim 3 and allow the jaw 11 to be withdrawn from the groove 24. As the spring portion 6 shifts its position around the rim 3, the finger 8 is also moved out of the groove 24. The stud 23 may then be withdrawn and the materials G and H separated from each other. As soon as the pressure on the knob F is released, the finger 8 and the jaw 11 return to their normal positions under the influence of the spring portion 6.

A modification in the form of the locking member 4 is illustrated in Figs. 9 and 10. A hole 30 is punched in the member and the material 31 displaced is bent over as shown at 32, to provide a knob by means of which the locking member may be moved in the housing.

From the foregoing it is apparent that I have provided a snap fastener that is extremely simple in construction and may be cheaply manufactured, as it is possible to form substantially all of the parts from metal stampings. The arrangement of the parts of the plug and socket members is such as to permit their ready attachment to the materials which it is desired to secure together. The stud member is readily inserted into the socket member by the application of a slight pressure, but when the locking members are once in locking engagement, the stud can only be withdrawn by the application of pressure to the knob on the outside of the socket housing.

What I desire to claim and secure by Letters Patent is:

1. In a device of the class described, the combination with a housing having a flanged opening and a depression and a stud having a groove, of an inherently resilient member slidable within said housing and having a jaw for entering the groove on said stud when the latter is received in said depression, and means projecting outside of said housing for flexing said member to release said jaw from the stud.

2. In a device of the class described, the combination with a housing having a flanged opening and a depression and a stud having a groove, of a locking member slidable within said housing and provided with a jaw for entering the groove on said stud when the latter is received in said depression, the said locking member being acted upon by a resilient portion integral therewith and engaging the rim of the said housing, and means for flexing said locking member from the outside of the housing to release said jaw from the stud.

3. In a device of the class described, the combination with a housing adapted to receive a stud provided with a groove, of an inherently resilient locking member slidable within said housing and provided with a jaw and a finger for entering the groove on said stud when the latter is received in said housing, and means extending through a slot in said housing for flexing said member therein to release said jaw and said finger from the stud.

4. In a device of the class described, the combination with a housing adapted to receive a stud provided with a groove, of a locking member slidable within said housing and provided with a jaw for entering the groove on said stud when the latter is received in said housing, the said locking member being also provided with a resilient portion surrounding said jaw and extending around the rim of said housing and terminating in a finger adapted to also enter the groove of said stud opposite to said jaw.

5. In a device of the class described, the combination with a housing adapted to receive a stud provided with a groove, of a locking member slidable within said housing and provided with a jaw for entering the groove on said stud when the latter is received in said housing, the said locking member being acted upon by an integral resilient portion extending around the rim of said housing and terminating in a finger adapted to also enter the groove of said stud opposite to said jaw, and means projecting outside of said housing for flexing said member therein, whereby to simultaneously disengage said jaw and said finger portion from said stud.

In witness whereof he has hereunto set his hand and affixed his seal this 7th day of June, 1920.

ELIS F. STENMAN. [L. S.]

Attested:
 WILLIAM E. BAFF,
 ALFRED D. HARRINGTON.